United States Patent
Shieh et al.

(10) Patent No.: US 10,992,662 B2
(45) Date of Patent: *Apr. 27, 2021

(54) ENABLING/DISABLING APPLICATIONS USING FACE AUTHENTICATION

(71) Applicant: International Business Machines Corporation, Armonk, NY (US)

(72) Inventors: Johnny Shieh, Austin, TX (US); Jessica Murillo, Round Rock, TX (US); Susann Keohane, Austin, TX (US); Gerald McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/727,786

(22) Filed: Oct. 9, 2017

(65) Prior Publication Data
US 2019/0109845 A1 Apr. 11, 2019

(51) Int. Cl.
*H04L 29/06* (2006.01)
*G06K 9/00* (2006.01)

(52) U.S. Cl.
CPC .......... *H04L 63/0861* (2013.01); *H04L 63/18* (2013.01); *H04L 65/4007* (2013.01); *G06K 9/00288* (2013.01); *H04L 63/06* (2013.01)

(58) Field of Classification Search
CPC ..... H04L 63/0861; H04L 63/06; H04L 63/18; H04L 65/4007; G06K 9/00288
See application file for complete search history.

(56) References Cited

U.S. PATENT DOCUMENTS

| 6,021,181 | A | * | 2/2000 | Miner | H04M 3/436 379/88.02 |
| 7,263,205 | B2 | | 8/2007 | Lev | |
| 8,370,262 | B2 | * | 2/2013 | Blessing | H04L 63/0861 705/64 |
| 8,391,825 | B2 | | 3/2013 | Arseneau et al. | |
| 8,488,752 | B1 | * | 7/2013 | Wiesen | H04M 1/7255 379/211.02 |

(Continued)

FOREIGN PATENT DOCUMENTS

| WO | 2016094807 A1 | 6/2016 |
| WO | 2016111728 A9 | 7/2016 |

OTHER PUBLICATIONS

Dug et al., "Your face is not your password," Face Authentication Bypassing Lenovo—Asus—Toshiba, Black Hat Briefings (2009), pp. 1-16.

(Continued)

*Primary Examiner* — Carl G Colin
*Assistant Examiner* — Hany S. Gadalla
(74) *Attorney, Agent, or Firm* — Jared L. Montanaro

(57) ABSTRACT

A first processor may receive a first request, from a first user, to initiate a first application. The first processor may initiate a first recording device. Initiating the first recording may include executing firmware embedded in the first recording device. The first processor may validate the identity of the first user using the first recording device. The first processor may initiate the first application. Initiating the first application may include loading and executing a first operating system associated with the first application.

9 Claims, 6 Drawing Sheets

(56) References Cited

U.S. PATENT DOCUMENTS

| | | | |
|---|---|---|---|
| 8,887,303 B2* | 11/2014 | Sundaram | G06F 21/6227 709/204 |
| 9,311,525 B2 | 4/2016 | Kim et al. | |
| 2006/0188077 A1* | 8/2006 | Susen | H04M 3/2281 379/114.01 |
| 2006/0259755 A1* | 11/2006 | Kenoyer | G06F 21/32 713/1 |
| 2007/0165796 A1* | 7/2007 | Jones | H04M 3/493 379/88.06 |
| 2009/0037742 A1* | 2/2009 | Narayanaswami | G07C 9/00158 713/186 |
| 2011/0047384 A1 | 2/2011 | Jacobs et al. | |
| 2013/0121541 A1 | 5/2013 | Hwang | |
| 2013/0223696 A1* | 8/2013 | Azar | G06K 9/00892 382/118 |
| 2013/0305337 A1* | 11/2013 | Newman | H04L 12/1818 726/7 |
| 2014/0365884 A1* | 12/2014 | Kara | G06F 3/0484 715/704 |
| 2014/0379339 A1* | 12/2014 | Timem | G10L 17/22 704/246 |
| 2015/0195288 A1* | 7/2015 | Hoyos | G06F 21/34 726/4 |
| 2015/0257004 A1* | 9/2015 | Shanmugam | H04W 12/06 455/411 |
| 2015/0319402 A1* | 11/2015 | Abuelsaad | H04N 5/91 386/224 |
| 2015/0365522 A1* | 12/2015 | Anderson | H04L 12/18 379/188 |
| 2016/0127363 A1* | 5/2016 | Vea Orte | H04L 63/10 726/4 |
| 2016/0174020 A1 | 6/2016 | Huttunen et al. | |
| 2017/0339272 A1* | 11/2017 | Obaidi | G10L 25/51 |
| 2018/0225940 A1* | 8/2018 | Siminoff | G08B 13/19671 |
| 2018/0262476 A1* | 9/2018 | Wyn-Harris | G06F 21/316 |
| 2018/0294959 A1* | 10/2018 | Traynor | H04L 9/0844 |
| 2020/0042685 A1* | 2/2020 | Tussy | G06K 9/00912 |

OTHER PUBLICATIONS

Lecher, C., "Mark Zuckerberg tapes up his webcam," http://www.theverge.om/2016/6/21/11995032/mark-zuckerberg-webcam-tape-photo, Jun. 21, 2016, 6 pgs., printed Aug. 22, 2017.

Niinuma et al., "Soft Biometric Traits for Continuous User Authentication." IEEE Transactions on Information Forensics and Security, vol. 5, No. 4, Dec. 2010 pp. 771-780.

Shier et al., "Enabling/Disabling Applications Using Face Authentication," U.S. Appl. No. 15/815,033, filed Nov. 16, 2017.

List of IBM Patents or Patent Applications Treated as Related, Nov. 15, 2017, 2 pgs.

* cited by examiner

US 10,992,662 B2

ENABLING/DISABLING APPLICATIONS USING FACE AUTHENTICATION

BACKGROUND

The present disclosure relates generally to the field of digital security, and more specifically to identity authentication during two-way communication.

Built into many tablets, cellphones, and computer systems are webcams. Webcams provide the ability for a user to perform many functions, such as, web conferencing or video messaging. There are many warnings about turning off webcams unless needed at a specific time or for a specific use.

SUMMARY

Embodiments of the present disclosure include a method, computer program product, and system for enabling or disabling webcams using facial authentication. A first processor may receive a first request, from a first user, to initiate a first application. The first processor may initiate a first recording device. Initiating the first recording may include executing firmware embedded in the first recording device. The first processor may validate the identity of the first user using the first recording device. The first processor may initiate the first application. Initiating the first application may include loading and executing a first operating system associated with the first application.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
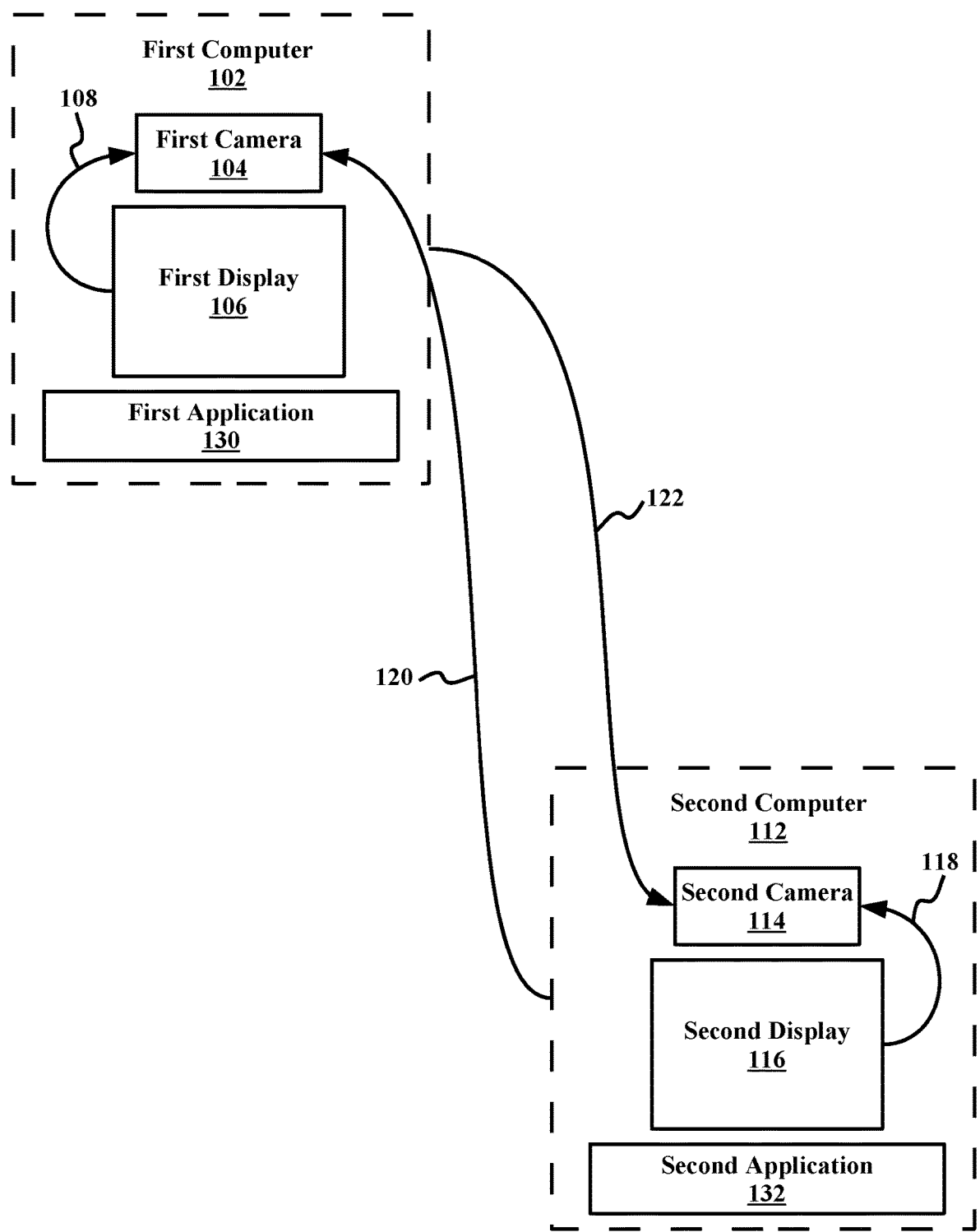
FIG. 1 depicts a block diagram of an example system in the process of establishing a two-way communication connection, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of digital security, and more specifically to identity authentication during two-way communication. While the present disclosure is not necessarily limited to such applications, various aspects of the disclosure may be appreciated through a discussion of various examples using this context.

A first user may desire to verify the identity of a second user that the first user is communicating with over a communication device (e.g., a cellphone, a desktop computer, a laptop, etc.). The first user may additionally desire to ensure that they are the only user allowed access to a specific application on the communication device. In both cases, the first user may turn to identification verification techniques that utilize recording devices (e.g., cameras, webcams, microphones, etc.) included in both the first user's and the second user's communication devices.

In some embodiments, a first processor (e.g., on a first communication device) may receive, from a first user, a first request to initiate a first application. The first processor may initiate a first recording device. In some embodiments, initiating the first recording device may include executing firmware embedded in the first recording device. The first processor may validate the identity of the first user using the first recording device. In some embodiments, the first processor may initiate (e.g., initialize, load data, start-up, etc.) the first application. In some embodiments, the first processor may initiate the first application in response to validating the first user. Initiating the first application may include loading and executing a first operating system associated with the first application.

For example, a user owning a touchscreen smartphone may tap on a text messaging application icon. The smartphone may identify, from the taping, that the user wants to open the text messaging application and the smartphone may direct a front facing camera on the smartphone to turn on. The smartphone, using the front facing camera may analyze the face of the user, and scanning the photos saved in the smartphone may, with a 98% confidence (e.g., certainty, confidence threshold) determine that the user, as owner of the phone, is allowed to access the text messaging application. The smartphone may then initiate the text messaging application.

In some embodiments, firmware (e.g. facial recognition firmware, etc.) on the first recording device may direct the first processor to initiate the first recording device. That is, following the example above, the front facing camera may automatically turn on due to identifying that the user desires to access the text messaging application. The smartphone does not have to direct the front facing camera to turn on, that is, the operating system of the smartphone does not have to be loaded and executed to turn on the front facing camera. The benefit to having firmware on the first recording device is that it is less likely for firmware to be altered by an attacker (e.g., computer hacker, etc.) versus other software (e.g., an application, operating system, etc.) executed by the first processor. An additionally benefit to having firmware is that an operating system would not have to load to perform the authentication, which would allow any user to use face-based authentication to determine whether to boot-up an application. In some embodiments, if the identity of the first user is not validated, the first application may not be initiated and the first user may be barred for using the first application until validity of the first user's identity is confirmed.

In some embodiments, a second processor (e.g., on a second communication device) may receive, from a second user, a second request to initiate a second application. The second processor may initiate a second recording device. Initiating the second recording device may include executing firmware embedded in the second recording device. The second processor may validate the identity of the second user using the second recording device. In some embodiments, the second processor may initiate the second application. Initiating the second application may include loading and executing a second operating system associated with the first application. In some embodiments, the second processor (and/or the first processor) may establish a communication connection between the first processor and the second processor. In some embodiments, in response to establishing the communication connection, the first processor may allow the first user to use (e.g., operate, etc.) the first application and the second processor may allow the second user to use the second application.

In some embodiments, the first application and the second application may be the same application used for communication between users. For example, an employer may try to initiate a web-conference with an employee. The employer, on their laptop computer, may click the web-conference icon associated with web-conference application and the webcam built into the laptop may turn on. The webcam, using firmware encoded only for the webcam, may validate the employer's identity using a database of company founder headshots and begin initiating the web-conference application (e.g., booting, starting, etc.).

Additionally, the employee, on their laptop computer, may click the web-conference icon associated with the web-conference application and the webcam built into the employee's laptop may turn on. Using firmware encoded on the employee's webcam, the employee's webcam may validate the employee's identity using a database of employee headshots and initiate the web-conference application. Using the web-conference application, the employer's laptop and the employee's laptop may identify that both the employer and the employee have initiated the same web-conference application and establish a two-way communication link between the employer and employee's laptops. The employer and employee may now be able to communicate through the web-conference application.

In some embodiments, request(s) to initiate the application(s) by the first and/or second users may be made through a webpage or internet program. In some embodiments, if the identity of the second user is not validated, the second application may not be initiated and the second user may be barred from initiating the second application until validation of the second user's identity is confirmed. In some embodiments, if the first user's and/or the second user's identity is not validated, no communication connection may be established.

In some embodiments, the second processor may receive a verification command from the first processor. The second processor may allow the first processor to access the second recording device. In some embodiments, the first processor may validate, in response to being allowed access to the second recording device, the identity of the second user using the second recording device. The first processor may validate the identity of the second user using the second recording device so as to not allow access to the first user's recording device in case the second user is not who they say they are. (e.g., neither the first user's recording device, nor their communication device may be compromised).

Following the example above, before establishing the two-way communication link between the employer and employee's laptops, the employer's laptop (e.g., by way of have stricter security layers and/or protocols) may send a command that allows the employer's laptop to verify the employee's identity. The employee's laptop may receive the command and allow the employer's laptop to access the employee's webcam. The employer's laptop may access the database of employee headshots and verify that the employee is who is connecting to the web-conference. In some embodiments, the employee's laptop (e.g., the second processor) may perform the functions aforementioned or the employer's laptop and the employee's laptop may both perform the functions aforementioned simultaneously (e.g., the second processor verifying the identity of the first user and the first processor verifying the identity of the second user).

In some embodiments, the first processor may revalidate the identity of the first user using the first recording device. The first processor may determine, in response to revalidating the identity of the first user, to keep the communication connection between the first processor and the second processor established. In some embodiments, if the identity of the first user is not revalidated, the communication connection may be terminated and the first user may be barred from accessing the first application until revalidation is confirmed.

For example, a webcam on a software developer's desktop computer may be programmed to revalidate the developer's identity every 15 seconds to ensure that no one is able to pilfer the code they are developing. The identity of the developer may have already been verified via a webcam on their desktop computer and the webcam may have verified every 15 seconds for 30 minutes that the developer is still the individual working on the desktop. However, at 30 minutes and 15 seconds the webcam may activate and identify that the developer is not in-front of the desktop (e.g., either a new person is in-front of the desktop or the developer has left and no person is visible to the webcam). The webcam may terminate the coding application that the developer is working on and shutdown access to the computer until validation of the developer's identity is confirmed. In some embodiments, the desktop may save any work being created in an application before terminating the application.

In some embodiments, to validate (or revalidate) the identity of the first user using the first recording device, the first processor may generate a snapshot of the first user using the first recording device. The first processor may analyze the snapshot of the first user by accessing a database. In some embodiments, the database may include one or more representations associated with the first user (e.g., an image, a video, an audio recording, etc.). In some embodiments, the first processor may determine that the snapshot is within a validation threshold.

For example, a user, using a cellphone, may be having a phone conversation with a person. The cellphone may periodically (e.g., every 10 seconds) take a sample of the conversation (e.g., a snapshot) and analyze the user's voice to verify that the user is on the phone. The cellphone may use the user's voicemail as a verified voice associated with the user and compare the sample to the voicemail. The cellphone may determine that the sample has a voice that is a 95% match to the voicemail (e.g., a validation threshold).

The cellphone may determine that a 95% match is enough to validate the identity of the user and continue to let the call be connected to the person.

In some embodiments, if the cellphone determines that the sample is below a threshold (e.g., 80%, etc.) the cellphone may increase the period of sampling (e.g., to every 5 seconds). In some embodiments, the cellphone may terminate the call connection if the sample is below a threshold. For example, the user's friend may have taken the user's cellphone and may have begun talking to the person. The cellphone may take another sample of the conversation and compare the sample to the voicemail. The cellphone may determine that the voice in the sample is a 10% match to the voicemail and terminate the call to the person.

In some embodiments, the verification command sent from the first processor and received by the second processor may include an embedded key associated with the second user. In some embodiments, the embedded key may be a representation of the second user. In some embodiments, the first processor may use the second recording device and identify that the second user and the representation of the second user are within a validation threshold.

For example, two coworkers may have only communicated over email for the past two weeks, and each coworker may only know the other's face from a thumbnail picture associated with the respective coworker. The coworkers may determine that it is time to have a video-conference and begin by starting a video-conference application on their respective computers. The first coworker's computer may take the thumbnail picture and embed the thumbnail picture into a verification command as a public key. The first coworker's computer may send the verification command with the embedded thumbnail picture to the second coworker's computer, and the second coworker's computer may allow the first coworker's computer to access the second coworker's webcam.

The first coworker's computer may analyze the second coworker's face using the webcam and using the second coworker's face as a private key (e.g., the second coworker's computer only grants access to its camera if the thumbnail picture matches the second coworker's face), the first coworker's computer may verify the second coworker's identity by comparing the second coworker's face to the second coworker's thumbnail picture. The first coworker's computer may determine that the second coworker's face and second coworker's thumbnail picture are a 90% match (e.g., 90% instead of 95% or even 100% because the second coworker had a different lighting when the thumbnail picture versus the desk lamp illuminating him now) and establish the web-conference connection. In some embodiments, the second coworker's computer may verify the first coworker's identity (e.g., both parties verify the other's identity) before establishing the web-conference connection.

In some embodiments, the first processor may generate a first snapshot of the second user using the second recording device during a first time period. In some embodiments, the first time period may be within a predetermined time interval. In some embodiments, the first processor may analyze the first snapshot of the second user by accessing a database. In some embodiments, the database may include one or more representations associated with the second user. The first processor may determine that the first snapshot is not within a validation threshold. The first processor may alert the first user with an indicator that the communication connection will be terminated.

In some embodiments, the first processor may increase the predetermined time interval. The first processor may generate a second snapshot of the second user using the second recording device during a second time period within the increased time interval. The first processor may analyze the second snapshot of the second user by accessing the database. The first processor may determine that the second snapshot is not within a validation threshold. The first processor may terminate the communication connection. In some embodiments, terminating the communication connection may shut down the first application and the first recording device.

For example, a video call may already be established and in progress between a husband using a laptop and a wife using a smartphone. The smartphone may be set to validate the husband's identity within an 85% degree of certainty every 20 seconds (e.g., if the degree of certainty is within the range of 85% to 100%, the husband's identity is validated). The smartphone may then after the first 20 seconds of the established video call, take a snapshot of the video call using the laptop's webcam. The snapshot may include a 1 second video clip of the husband's face and him saying "okay." The smartphone may then access videos and photos on the smartphone, and using facial recognition and audio techniques built into the smartphone, identify videos and photos associated with the husband. The smartphone may identify from the husband's voice saying "okay" and his face, that the wife is 99% talking to her husband.

In the next 20 seconds the husband may leave his laptop and exit the room where he was video calling. Additionally, his identical twin brother with a higher octave voice may enter the room and begin chatting with the wife. The smartphone may take another snapshot that includes a 1 second video clip of the twin brother saying "hi." The smartphone may again access the videos and photos stored on smartphone and determine with only a 90% degree of certainty that the wife is speaking with the husband. The smartphone may note that the degree of certainty dropped 9% and alert the wife with a text message and/or outlining the video call screen in red that her husband may not be on the other end of the video call and that the video call may be terminated. The smartphone may then increase the snapshot interval time to 5 seconds, in order to provide more sampling for validation of the husband.

The smartphone may then after 5 seconds take another snapshot of the twin brother. The snapshot may include a 1 second video clip of the twin brother laughing. The smartphone analyzing the snapshot against videos and photos in the smartphone may identify the laugh in a video and now determine with a 45% degree of certainty that the wife is talking with the husband. The smartphone may come to a 45% degree of certainty based on the 100% degree of certainty that the higher octave laugh does not belong to the husband (e.g., a 0% degree of certainty that it is the husband), however the facial recognition is at a 90% degree of certainty that it is the husband (e.g., because of the similarity between the identical twin brothers). The smartphone may then determine that the degree of certainty is too low and disconnect the smartphone from the video call. In some embodiments, the smartphone may present the wife with a notification that allows the wife to choose to disconnect from the video call or not.

Referring now to FIG. 1, depicted is a block diagram of an example system 100 in the process of establishing a two-way communication connection, in accordance with embodiments of the present disclosure. In some embodiments, the system 100 may include a first computer 102 and a second computer 112. The first computer 102 may include a first camera 104 (e.g., a first recording device) and a first display 106 (e.g., a screen, etc.). The second computer 112 may include a second camera 114 (e.g., a second recording device) and a second display 116.

In some embodiments, the first computer 102 may receive a first request to initiate a first application 130 from a first user. The first user may input the first request into the first computer 102 using a graphical user interface displayed on the first display 106. In some embodiments, upon receiving the first request on the first display 106 from the first user, the first computer 102 may follow path 108 and initiate the first camera 104. The first computer 102 may validate the identity of the first user using the first camera 104. The first computer 102 may initiate the first application 130.

In some embodiments, the second computer 112 may receive a second request to initiate a second application 132 from a second user. The second application 132 may be the same application as the first application 130 (e.g., the same web-conferencing application, texting application, etc.). The second user may input the second request into the second computer 112 using a graphical user interface displayed on the second display 116. In some embodiments, upon receiving the second request on the second display 116 from the second user, the second computer 112 may follow path 118 and initiate the second camera 114. The second computer 112 may validate the identity of the second user using the second camera 114. The second computer 112 may initiate the second application 132.

In some embodiments, upon validating the identity of the first user, the first computer 102 may send a verification command via path 122 to the second computer 112. In some embodiments, upon receiving the verification command, the second computer 112 may allow the first computer 102 to access the second camera 114. The first computer 102 may validate the identity of the second user.

In some embodiments, upon validating the identity of the second user (either by the first computer 102 or by the second computer 112), the second computer 112 may send a verification command via path 120 to the first computer 102. In some embodiments, upon receiving the verification command, the first computer 102 may allow the second computer 112 to access the first camera 104. The second computer 112 may validate the identity of the first user.

In some embodiments, upon both the first computer 102 and the second computer 112 validating (e.g., verifying) both the first user's and the second user's identities, a two-way communication connection may be established between the first computer 102 and the second computer 112. It is noted that all the steps described above in relation to FIG. 1 may be performed simultaneously or in any order. In some embodiments, one or more of the steps described with respect to FIG. 1 may not be performed at all. For example, in some embodiments the first computer 102 validates both the first user and the second user, while the second computer 112 only validates the second user.

Figure 2:
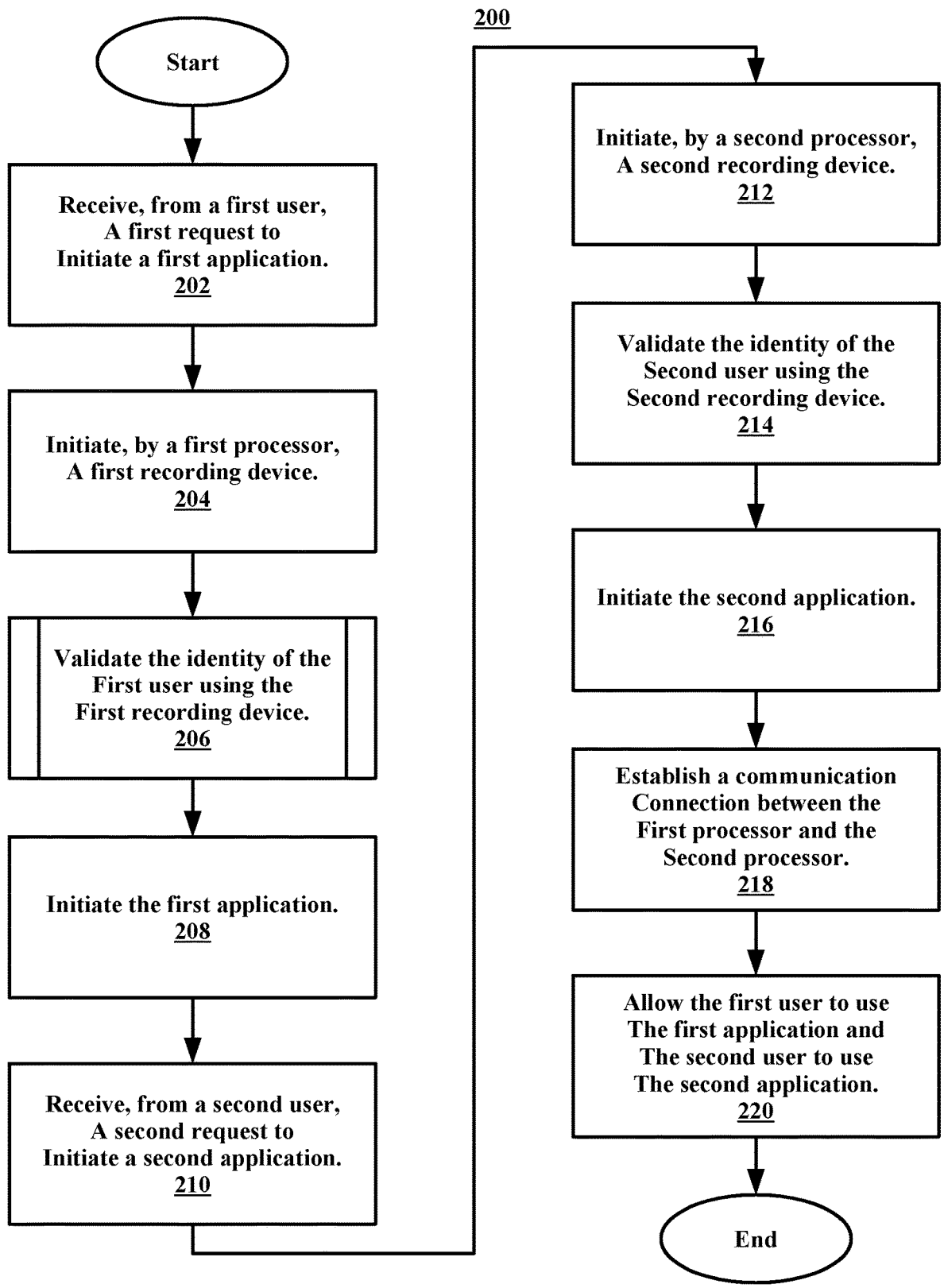
FIG. 2 illustrates a flowchart an example method for allowing a first user to have access to a first application and a second user to have access to a second application, in accordance with embodiments of the present disclosure.

Referring now to FIG. 2, illustrated is a flowchart an example method 200 for allowing a first user to have access to a first application and a second user to have access to a second application, in accordance with embodiments of the present disclosure. In some embodiments, the method 200 may begin at operation 202. At operation 202, a first processor may receive, from a first user, a first request to initiate a first application.

In some embodiments, the method 200 may proceed to operation 204, where the first processor may initiate a first recording device. In some embodiments, the method 200 may proceed to operation 206, which will be described more fully in FIG. 3. At operation 206, the first processor may validate the identity of the first user using the first recording device. In some embodiments, after validating the identity of the first user at operation 206, the method 200 may proceed to operation 208. At operation 208, the first processor may initiate the first application.

In some embodiments, the method 200 may proceed to operation 210. At operation 210, a second processor may receive, from a second user, a second request to initiate a second application. In some embodiments, the first processor and the second processor may be on separate computing devices (e.g., separate servers, computers, smartphones, tablets, etc.). In some embodiments, the first and second applications may be the same applications. In some embodiments, the first request and the second request may be the same request and simultaneously received by both the first processor and the second processor. For example, a moderator of a web-conference may send an invitation to the web-conference to two coworkers. The invitation may simultaneously start the identification verification of both the coworkers using their respective webcams.

In some embodiments, the method 200 may proceed to operation 212. At operation 212, the second processor may initiate a second recording device. In some embodiments, the method 200 may proceed to operation 214, where the second processor may validate the identity of the second user using the second recording device. In some embodiments, the method 200 may proceed to operation 216. At operation 216, the second processor may initiate the second application.

In some embodiments, the method 200 may proceed to operation 218. At operation 218, the first processor (and/or the second processor) may establish a communication connection between the first processor and the second processor. In some embodiments, the method 200 may proceed to operation 220. At operation 220, the first processor may allow the first user to use the first application and the second processor may allow the second user to use the second application.

In some embodiments, the first processor and the second processor may be the same processor. For example, the first user and the second user may both send requests to initiate the same application housed on a cloud-server, the cloud-server (e.g., the first and second processors) may use the first and second recording devices to verify each user and allow each user to have access to the application. In some embodiments, after operation 220, the method 200 may end.

As discussed in more detail herein, it is contemplated that some or all of the operations of the method 200 may be performed in alternative orders or may not be performed at all; furthermore, multiple operations may occur at the same time or as an internal part of a larger process. For example, in some embodiments operations 210-220 may not be performed at all. Instead, the first user may be granted access to the first application as part of initiating (e.g., starting) the first application (e.g., an operating system or other application) in operation 208 (e.g., after his identity has been validated).

Figure 3:
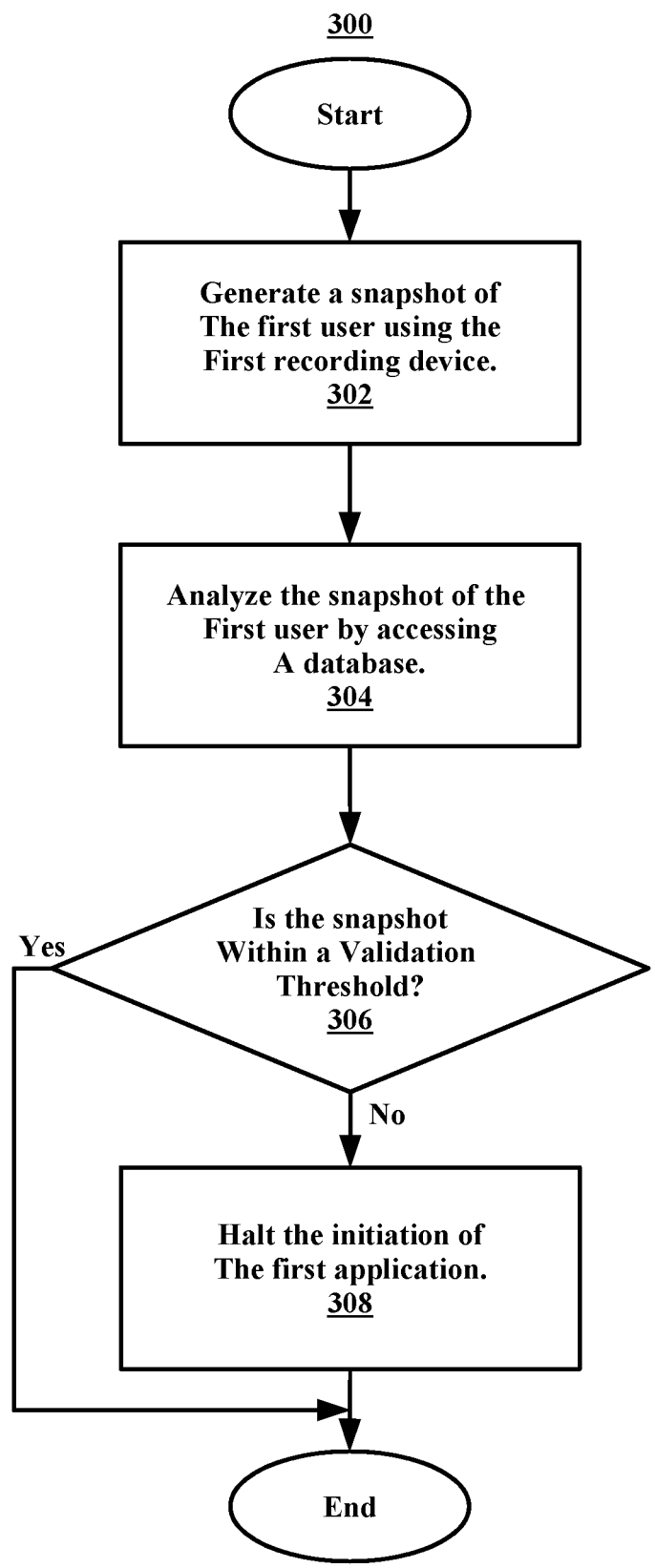
FIG. 3 illustrates a flowchart of an example method for validating the identity of a first user using a first recording device, in accordance with embodiments of the present disclosure.

Referring now to FIG. 3, illustrated a flowchart of an example method 300 for validating the identity of a first user using a first recording device, in accordance with embodiments of the present disclosure. In some embodiments, the method 300 may be performed as part of operation 206 of FIG. 2. In some embodiments, the method 300 may use the first processor to revalidate the identity of the first user. In some embodiments, the method 300 may use the second processor to validate the identity of the first user. In some embodiments, the method 300 may begin at operation 302.

At operation 302, the first processor may generate a snapshot of the first user using the first recording device.

In some embodiments, the method 300 may proceed to operation 304. At operation 304, the first processor may analyze the snapshot of the first user by accessing a database. In some embodiments, the method 300 may proceed to decision block 306. At decision block 306, the first processor may determine if the snapshot is within a validation threshold. If, at decision block 306, the first processor determines that the snapshot is within the validation threshold, the method 300 may end. In some embodiments, upon ending the method 300, the first application may be initiated as described above in relation to operation 208 of FIG. 2.

In some embodiments, if, at decision block 306, the first processor determines that the snapshot is not within the validation threshold, the method 300 may proceed to operation 308. At operation 308, the first processor may halt the initiation of the first application. In some embodiments, after operation 308, the method 300 may end. In some embodiments, if the first processor halts the initiation of the first application at operation 308, the method 200 of FIG. 2 may also be halted and stopped at operation 206.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
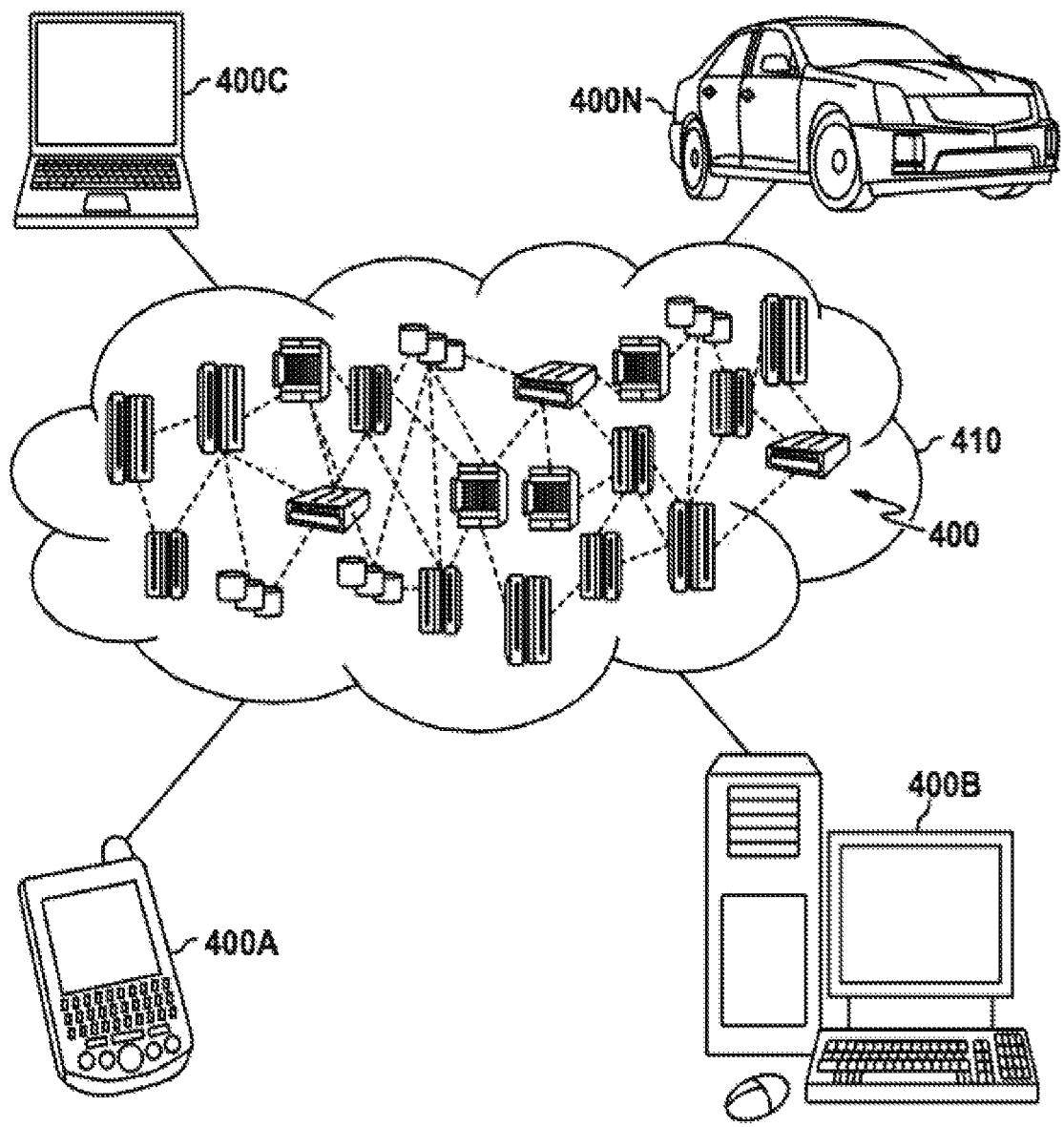
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
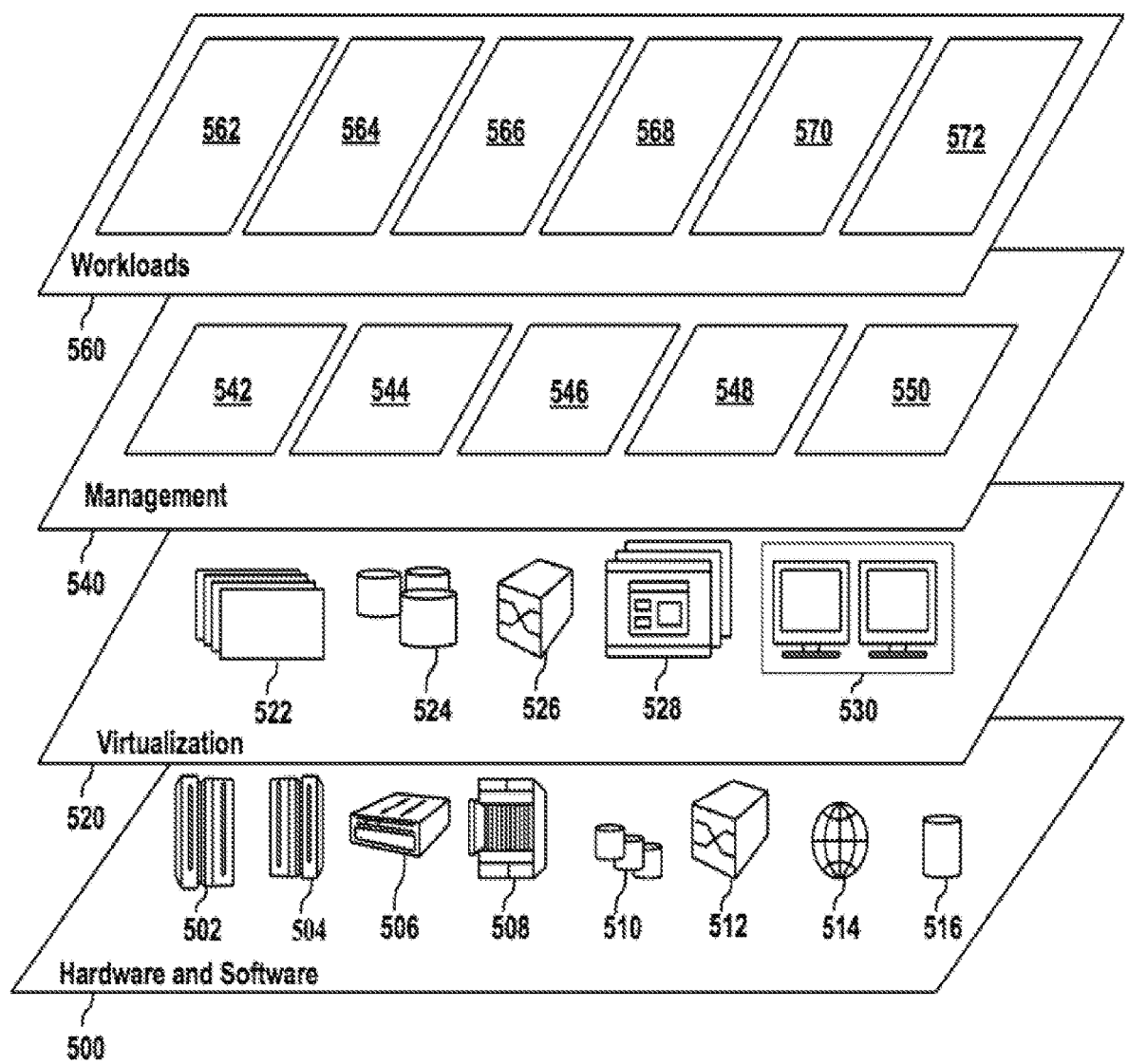
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and identifying an identifiable media 572.

Figure 6:
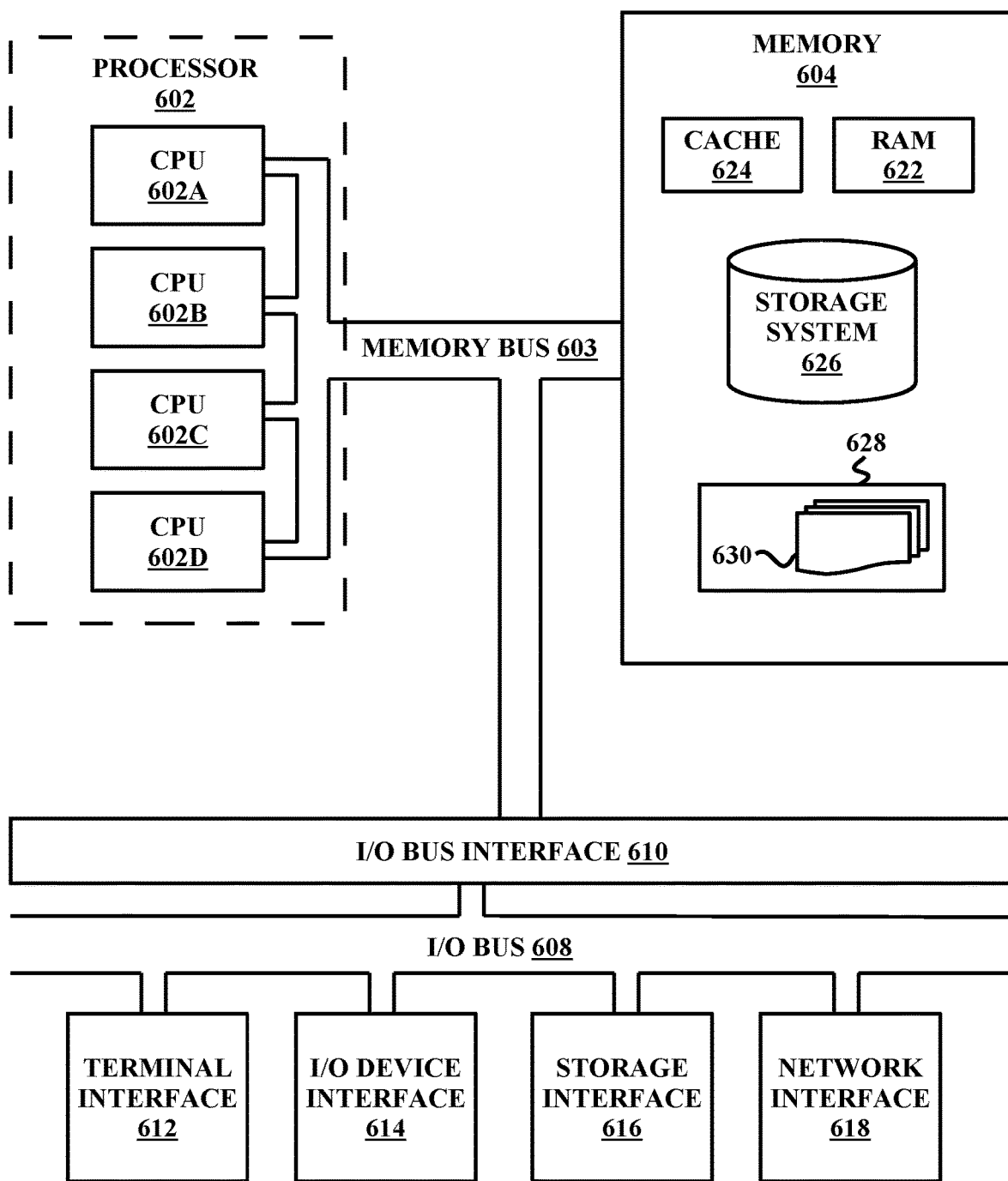
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system comprising:
a memory; and
a processor in communication with the memory, the processor being configured to perform operations comprising:
receiving, from a first user, a first request to initiate a first application on a first computing device;
initiating a first recording device of the first computing device, wherein the first recording device is a first camera, wherein initiating the first recording device includes executing firmware embedded in the first recording device, and wherein executing the firmware causes the first recording device to record during boot-up of the first application;
validating the identity of the first user using the first recording device;
initiating the first application, wherein initiating the first application includes loading and executing an operating system;
receiving, from a second user, a second request to initiate a second application on a second computing device;
initiating, by a second processor, a second recording device of the second computing device, wherein the second computing device is a second camera, wherein initiating the second recording device includes executing firmware embedded in the second recording device, and wherein executing the firmware causes the second recording device to record during boot-up of the second application;
validating the identity of the second user using the second recording device;
initiating the second application, wherein initiating the second application includes loading and executing a second operating system;
establishing a communication connection between the first processor and the second processor;
allowing, in response to establishing the communication connection, the first user to use the first application and, the second user to use to the second application;
receiving, from the first processor, a verification command, wherein the verification command includes an embedded public key associated with the second user, wherein the embedded public key is a thumbnail picture of the second user;
allowing the first computing device to control the second recording device of the second computing device, wherein allowing the first computing device to control the second recording device includes allowing the first computing device to record the second user using the second recording device;
validating, in response to the first computing device being allowed to control the second recording device, the identity of the second user using the first computing device, wherein the first computing device uses the recording of the second user as a private key to validate the identity of the second user;
receiving, from the second computing device, a second verification command, wherein the second verification command includes a second embedded public key associated with the first user, wherein the second embedded public key is a second thumbnail picture of the first user;
allowing the second computing device to control the first recording device of the first computing device, wherein allowing the second computing device to control the first recording device includes allowing the second computing device to record the first user using the first recording device; and
validating, in response to the second computing device being allowed to control the first recording device, the identity of the first user using the second computing device, wherein the validating of the first user using the second computing device is simultaneous to the validating of the second user using the first computing device.

2. The system of claim 1, wherein the operations performed by the processor further include:
identifying, by the first computing device using the second recording device, that the second user and the representation of the second user are within a validation threshold.

3. The system of claim 1, wherein the operations performed by the processor further include:
revalidating the identity of the first user using the first recording device; and
determining, in response to revalidating the identity of the first user, to keep the communication connection between the first computing device and the second computing device established.

4. The system of claim 3, wherein the operations performed by the processor further include:
generating a first snapshot of the second user using the second recording device during a first time period, wherein the first time period is within a predetermined time interval;
analyzing the first snapshot of the second user by accessing a database, wherein the database includes one or more representations associated with the second user;
determining that the first snapshot is not within a validation threshold;

alerting the first user with an indicator that the communication connection will be terminated;
increasing the predetermined time interval;
generating a second snapshot of the second user using the second recording device during a second time period within the increased time interval;
analyzing the second snapshot of the second user by accessing the database;
determining that the second snapshot is not within a validation threshold; and
terminating the communication connection, wherein terminating the communication connection will shut down the first application and the first recording device, and wherein terminating the communication will disconnect the first computing device and the second computing device.

5. The system of claim 1, wherein validating the identity of the first user using the first recording device comprises:
generating a snapshot of the first user using the first recording device;
analyzing the snapshot of the first user by accessing a database, wherein the database includes one or more representations associated with the first user;
determining that the snapshot is within a validation threshold.

6. A computer program product comprising a non-transitory computer readable storage medium having program instructions embodied therewith, the program instructions executable by a processor to cause the processor to perform a method, the method comprising:
receiving, from a first user, a first request to initiate a first application on a first computing device;
initiating a first recording device of the first computing device, wherein the first recording device is a first camera, wherein initiating the first recording device includes executing firmware embedded in the first recording device, and wherein executing the firmware causes the first recording device to record during boot-up of the first application;
validating the identity of the first user using the first recording device;
initiating the first application, wherein initiating the first application includes loading and executing an operating system;
receiving, from a second user, a second request to initiate a second application on a second computing device;
initiating, by a second processor, a second recording device of the second computing device, wherein the second computing device is a second camera, wherein initiating the second recording device includes executing firmware embedded in the second recording device, and wherein executing the firmware causes the second recording device to record during boot-up of the second application;
validating the identity of the second user using the second recording device;
initiating the second application, wherein initiating the second application includes loading and executing a second operating system;
establishing a communication connection between the first processor and the second processor;
allowing, in response to establishing the communication connection, the first user to use the first application and, the second user to use the second application;
receiving, from the first processor, a verification command, wherein the verification command includes an embedded public key associated with the second user, wherein the embedded public key is a thumbnail picture of the second user;
allowing the first computing device to control the second recording device of the second computing device, wherein allowing the first computing device to control the second recording device includes allowing the first computing device to record the second user using the second recording device;
validating, in response to the first computing device being allowed to control the second recording device, the identity of the second user using the first computing device, wherein the first computing device uses the recording of the second user as a private key to validate the identity of the second user;
receiving, from the second computing device, a second verification command, wherein the second verification command includes a second embedded public key associated with the first user, wherein the second embedded public key is a second thumbnail picture of the first user;
allowing the second computing device to control the first recording device of the first computing device, wherein allowing the second computing device to control the first recording device includes allowing the second computing device to record the first user using the first recording device; and
validating, in response to the second computing device being allowed to control the first recording device, the identity of the first user using the second computing device, wherein the validating of the first user using the second computing device is simultaneous to the validating of the second user using the first computing device.

7. The computer program product of claim 6, wherein the method further comprises:
identifying, by the first computing device using the second recording device, that the second user and the representation of the second user are within a validation threshold.

8. The computer program product of claim 6, further comprising:
revalidating, by the first computing device, the identity of the first user using the first recording device; and
determining, in response to revalidating the identity of the first user, to keep the communication connection between the first computing device and the second computing device established.

9. The computer program product of claim 8 further comprising:
generating a first snapshot of the second user using the second recording device during a first time period, wherein the first time period is within a predetermined time interval;
analyzing the first snapshot of the second user by accessing a database, wherein the database includes one or more representations associated with the second user;
determining that the first snapshot is not within a validation threshold;
alerting the first user with an indicator that the communication connection will be terminated;
increasing the predetermined time interval;
generating a second snapshot of the second user using the second recording device during a second time period within the increased time interval;
analyzing the second snapshot of the second user by accessing the database;

determining that the second snapshot is not within a validation threshold; and terminating the communication connection, wherein terminating the communication connection will shut down the first application and the first recording device, and wherein terminating the communication will disconnect the first computing device and the second computing device.

\* \* \* \* \*